(12) United States Patent
Hoffmann et al.

(10) Patent No.: US 6,485,286 B1
(45) Date of Patent: Nov. 26, 2002

(54) EXCHANGEABLE CORRUGATOR

(75) Inventors: Thomas Hoffmann, Königsberg (DE); Rainer Weppert, Hassfurt (DE)

(73) Assignee: Frankische Rohrwerke Gebr Kirchner GmbH & Co. (DE)

( * ) Notice: Subject to any disclaimer, the term of this patent is extended or adjusted under 35 U.S.C. 154(b) by 0 days.

(21) Appl. No.: 09/542,067

(22) Filed: Apr. 3, 2000

(30) Foreign Application Priority Data

Apr. 1, 1999 (DE) .......................................... 199 14 974

(51) Int. Cl.$^7$ .............................................. B29C 53/30
(52) U.S. Cl. ........................ 425/183; 425/195; 425/336; 425/185; 425/388; 425/396; 425/233
(58) Field of Search .............................. 425/233, 326.1, 425/392, 395, 396, 336, 192 R, 195, 384, 388, 183, 185

(56) References Cited

U.S. PATENT DOCUMENTS

| | | | | |
|---|---|---|---|---|
| 4,325,685 A | * | 4/1982 | Lupke et al. | 425/183 |
| 4,504,206 A | * | 3/1985 | Lupke et al. | 425/326.1 |
| 5,560,941 A | * | 10/1996 | Hegler et al. | 425/185 |
| 5,645,871 A | * | 7/1997 | Berns et al. | 425/326.1 |
| 5,693,347 A | * | 12/1997 | Hegler | 425/233 |

FOREIGN PATENT DOCUMENTS

| | | |
|---|---|---|
| DE | 19535231 A1 | 3/1997 |
| EP | 0 007 556 B1 | 9/1981 |

* cited by examiner

Primary Examiner—Jan H. Silbaugh
Assistant Examiner—Thu Khanh T. Nguyen
(74) Attorney, Agent, or Firm—Pennie & Edmonds LLP

(57) ABSTRACT

The invention provides a molding apparatus and particularly a corrugator for manufacturing pipes, particularly corrugated pipes, having at least two series of circulation mold jaw parts, which form a molding channel in a predetermined area, and wherein the series are guided in respective circulation guides. The invention further provides that at least one exchangeable mold jaw parts or mold blocks is provided with another pipe molding wherein at least one exchange member is provided along at least one of the circulation guides of at least one of the mold jaw part series.

27 Claims, 4 Drawing Sheets

EXCHANGEABLE CORRUGATOR

FIELD OF THE INVENTION

The invention relates to a molding apparatus, particularly a corrugator for the manufacture of pipes, preferably corrugated pipes, with at least two series of circulating mold jaw parts or mold blocks, which preferably have a same molding shape. The circulating mold jaw parts form a molding channel in an assigned area and the series are guided in respective rotating guides. The molding apparatus has at least one exchange member along at least one of the circulation and/or pass round guides of at least one of the mold jaw series, wherein at least one alternating mold jaw is provided that has an optional profile or that has another molding design of the pipe.

BACKGROUND OF THE INVENTION

Corrugators for the manufacture of corrugated pipes are well known in the state of the art. As long as corrugated pipes are to be manufactured with a constant shape in a longitudinal direction it is possible to use conventional infinite corrugators with circulating mold jaw parts without encountering any problems. However, if corrugated pipes are to be manufactured having certain optional profile sections, it is necessary that these optional profiles be fitted into a mold jaw part chain, such as mold jaw parts or mold blocks for sleeves for example. Problems arise from the fact that these optional designs of corrugated pipes or pipes in general can only be provided on a same and hence rigidly assigned place. A variable optional design in the course of a continuously produced corrugated pipe without an interruption of the production process in the corrugator is not possible. The usual procedure is to include optional designs at certain positions in the corrugated pipe, which needs to be done at regular intervals or sections. This regularity is a result of the specific length of a certain mold jaw part chain. This means, that if an optional profile is required, every third length of a mold jaw part chain, it appears three times in each respective section of the corrugated pipe but two of these optional profiles are unused. These unused optional profiles can cause problems since they can become weak points.

The prior art describes an experiment in U.S. Pat. No. 4,325,685 A1 for a vertically aligned corrugator in which certain flexibility is created by providing mold jaw parts with multiple profiles. Among those multiple profiles are also optional profiles. These types of very wide mold jaw parts can be shifted horizontally on a vertically aligned machine table via a switch arrangement, so that an optional profile can be inserted when required. This solution, however, requires that if a certain flexibility is desired, each mold jaw part in a mold jaw part series needs to be designed accordingly complex having multiple profiles as well as optional profiles. As a result, a corrugator of this known type is extremely complicated, expensive, and in addition to that also delicate. Furthermore, the lateral positioning causes a problem in that the mold jaw parts can not be exactly aligned to the molding channel such that irregularities within the pipe profile arise.

EP 0 048 113 A2 and U.S. Pat. No. 3,981,663 also show modifications of corrugators which are also not able to solve, the aforementioned problems.

SUMMARY OF THE INVENTION

It is therefore an object of the present invention to provide a molding apparatus, particularly a corrugator, which can be flexibly used for the production of pipes and preferably corrugated pipes having an acceptable investment expenditure, and which can be flexibly provided with optional profiles.

The aforementioned object is partially or completely achieved in accordance with the invention by means of a molding apparatus having at least an exchange member along at least one of the circulation and/or pass round guides of at least one of the mold jaw series, wherein at least an alternating mold jaw is provided that has an optional profile or that has another molding design of the pipe.

It is evident that mold jaw parts or alternating mold jaw parts are used, which can provide more than one type of corrugated pipes or corrugated pipes with more than one diameter. The other types of corrugated pipes or corrugated pipes with different diameters can be used by adjustment of a machine table with respect to a nozzle of an extruder, from which the soft-plastic moldable plastic tube for the production of pipes or corrugated pipes comes out. For this it is necessary to interrupt the production process. Naturally, the extrusion nozzle can also be adjusted, or extrusion nozzle switches or extension pieces can be used in order to bring other mold jaw parts into action for the production of other types of corrugated pipes or corrugated pipes with different diameters.

Only a small number of mold jaw parts is replaced during a mold jaw part exchange, which occurs in accordance with the invention at a respective exchange member.

Advantageously, at least one exchange member is provided along each of the mold jaw part series. If required, two or more exchange members are provided along a mold jaw part series or a circulation and/or pass round guide.

The exchange member has at least two chambers, and each of the chambers has an entrance and an exit. The chambers are at least approximately similarly shaped as the circulation and/or pass round guides. This way, at least one of the chambers can be used as part of a pass round guide, so that it can serve as a guide for the mold jaw part series through the exchange member or the respective chamber of the exchange member. The respective chamber which is not used as a circulation and/or pass round guide serves as a reservoir for exchanging mold jaw parts, this means mold jaw parts with optional profiles, or for mold jaw parts that have been replaced with exchangeable mold jaw parts.

Of course, a respective exchange member can also be provided with three or more chambers, which are either included or excluded into the pass round guide, as desired, in order to include other mold jaw parts or exchangeable mold jaw parts with optional profiles, markings or the likes into the mold jaw part series that is used at a certain time.

At least one of the chambers of the exchange member has at least one exchangeable mold jaw part. Of course, a respective chamber can have multiple exchangeable mold jaw parts as per desired profile of a particular pipe product or corrugated pipe product.

The exchange member can be adjusted manually but it is advantageous to provide a drive section to remove a chamber with at least one mold jaw part from the pass round and/or circulation guide and to insert another chamber with at least one exchangeable mold jaw part, for example with an optional profile, into the circulation guide.

In accordance with the invention it is possible that the number of mold jaw parts in a mold jaw part series is smaller than the maximum number of mold jaw parts in a circulation guide. This requires a conveyor in order to move the mold jaw parts outside the molding channel faster than in the molding channel. This makes it possible to use less mold jaw parts in the corrugator than would be necessary for a closed mold jaw part series or a mold jaw part chain. This can be achieved for example by advance threads having different leads.

The changing of mold jaw parts is not so difficult in large corrugators because the low speed of circulation or passing round provides enough time to remove one mold jaw part and to replace it with another one.

Advantageously, the exchange member or exchange members are arranged in the area of the circulation guides where the molding channel is open. In other words, the mold jaw parts are not closed in the area in which the exchange member or exchange members are arranged, which means closed out of gear with the pipe. It is particularly advantageous to place the exchange members in the linear region of the return side of the molding channel of the apparatus or corrugators in accordance with the invention.

The drive section of the exchange member has preferably a cross slider that inserts one of the chambers into the pass round guides or that removes the other chamber which is presently in the circulation guides. The cross slider is preferably designed to carry out a linear motion. This linear motion proceeds particularly in the plane of the circulation guides or in the plane of the machine table of the respective circulation guides.

The drive section can work electro-mechanically, electro-magnetically, hydraulically, or pneumatically. In the pneumatically working embodiment the drive section works by means of a pneumatic cylinder. In the case of an electro-mechanical drive section, an electric motor in conjunction with a flywheel can carry out the motion of the exchange member as abruptly as possible for changing the mold jaw parts. An electromagnetic drive section can be realized by using magnets for example, and by changing their polarities such that a repulsion or attraction occurs.

Since the motion during the exchange of the mold jaw parts can not be carried out fast and abrupt without leading to collisions with the mold jaw part series that continue to run, it is advantageous, to arrange a damper or damping area preferably close to the exchange member(s) during the circulating or passing around guidance or each circulation guide, which compensates a backup area during activation of the exchange member. This damper member is particularly advantageous if a circulating or running with channel module is provided that is movable in the direction of the circulation. Preferably, the circulating or running with channel module is preloaded against the direction of circulation by means of a spring member. In the case of a change of a molding channel section, this means a chamber of the exchange member and hence of mold jaw parts for exchangeable mold jaw parts, the movable rotating channel module can be moved against the direction of circulation as part of the circulating and/or pass round guides. Afterwards, when the new chamber and thus the new mold jaw parts, i.e. the exchangeable mold jaw parts possibly with optional profile, are included in the mold jaw part series, the circulation with channel module is forced back into a base position via a spring member in order to serve again as a damper member in a future exchange.

There, the damper area or spring displacement are adjustable or are at least such that during a predetermined speed of circulation of the mold jaw parts and a predetermined and preferably changeable speed of movement of the exchange member, a backup can be brought under control.

In order to carry out a coordination of the exchange operation in relation to the circulation or pass around of the mold jaw parts, it is preferable to provide a sensor for sensing the position of at least one mold jaw part. Based on the data obtained from the sensor, the exchange member or exchange members can be activated such that one chamber is replaceable by another chamber in the continuous mold jaw part series, if the boundaries of the chamber or exchange member(s) do not collide with the mold jaw parts or are not aligned with the shock/impact positions between the mold jaw parts.

Basically, the sensor or sensors can be provided at any position of the apparatus in accordance with the invention, however, in this case a processor, such as a computer for example, needs to calculate the place of an exchange member or the places of exchange members along a rotating guide or along rotating guides.

Advantageously, the molding apparatus in accordance with the invention is provided with an exchange member having a placeholder. Such a placeholder is used in a place where an exchangeable mold jaw part or exchange mold is used in order to travel with the traveling mold jaw part series or to engage with the traveling mold jaw part series in order to maintain its place in the mold jaw part series when a normal mold jaw part is removed, so that an exchangeable mold jaw part can be used easily.

Accordingly, the placeholder can be a carrier jaw at which a molding profile section is determined and wherein the exchange member only carries out a change of the molding profile section. This means that a molding profile is determined via a latching connection or the like on the carrier jaw, which follows the mold jaw part series. Then, the mold jaw part section or the molding profile section is taken and the engagement between the placeholder or the carrier jaw and the molding profile section is removed. As soon as the molding profile section that needs to be exchanged is removed, the change member latches another optional molding profile section on to the placeholder or the carrier jaw. Instead of latching, it is of course possible to perform an insertion in guidings on the carrier jaw or to assign the changing mold or the optional molding profile section differently on the placeholder or carrier jaw.

Other types of placeholders can also be employed and as mentioned above, the placeholder has an area of overlap, which overlaps from one mold jaw part to the next mold jaw part but one. In this case, the placeholder has engagement sections, which engage with the mold jaw parts and the next mold jaw parts but one, in order to prevent in this manner that the area which becomes vacant is filled up during the removal of a mold jaw part located between one mold jaw part and the next mold jaw part but one in the mold jaw part series. This means, the area of overlap should have at least the dimensions of a mold jaw part in the direction of movement of the mold jaw part series. In this manner a mold jaw part that is to be exchanged can be substituted for by a placeholder and then an exchangeable mold jaw part with an optional profile can be placed in the position of the placeholder. As soon as the exchangeable mold jaw part is at its place of destination within the travelling mold jaw part series, the placeholder can be removed again.

Advantageously, the engagement sections are designed such that they fit to respective usually available structures on the mold jaw parts of the travelling mold jaw part series. Accordingly, the engagement sections should be provided as sprockets for example, which can engage with recesses or sprockets in travelling mold jaw parts of the mold jaw part series.

Advantageously, the last described manner of a placeholder can increase the distance between mold jaw parts, for example it could have a pneumatic cylinder or the like that works in the direction of a longitudinal extension, such that the distance between one mold jaw part and the next mold jaw part but one is slightly extended in order to have clearance during the exchange process and to make the exchange process more easy.

Advantageously, in order to make the exchange process easier, the sprocket-like engagement sections, for example, are designed such that their engagement with the sprockets of the mold jaw parts before and after the exchanged mold jaw part occurs with a shift, since during the forward drive of the engagement sections into the sprockets of the mold jaw parts and because of the incline of the sprockets, the mold jaw parts are forced apart for a small distance.

Another advantageous embodiment results when a magazine section is provided at the turning areas on one side, or if necessary on both sides, of the mold jaw part series. The magazine section travels at least temporarily with the mold jaw part series, and the exchange member is preferably provided at the magazine section in a travelling manner. The magazine section can be designed as a disk-like body, which is of the same radius as the inner radius of the mold jaw part series or the guiding section for the mold jaw part series in the turning area or return area of the mold jaw part series. Preferably, the magazine section travels synchronously. However, from time to time, if needed, such as when a mold jaw part is replaced with an optional profile mold jaw part at a certain position, the magazine section is synchronized and accordingly travels synchronously. The turning area can also be a preferred area for the arrangement of an exchange member in accordance with the invention, since there are radially extending parting gaps in the turning area between the mold jaw parts of the mold jaw part series. Furthermore, the likelihood for getting caught/hooked up in this area is small and hence a temporary or continuous synchronization is more easily realized.

Advantageously, a park-magazine section is arranged in the travelling mold jaw part series across from the magazine section. Mold jaw parts that are removed from the travelling mold jaw part series through the exchange member can be parked there until they are included again into the mold jaw part series replacing the optional profile mold jaw parts. Again, just like for the magazine section a temporary or continuous synchronization is performed. The continuous synchronization has the advantage that the exchanged mold jaw parts in the park-magazine section are always automatically at the right place in the turning area across from the optional profile mold jaw parts. The automatic positioning happens at a right time suitable for an exchange process. This is assuming that there are no deviations from the continuation of the mold jaw part series.

The inserted exchangeable molds or exchangeable mold jaw parts are advantageously designed for several variants of the procedure. For example, the molding apparatus can be designed as a corrugator for a high pressure procedure, i.e. starting from the extruder a high pressure is generated in the thermoplastic moldable plastic tube such that the plastic material is closely fitted to the mold jaw parts in the molding channel. In order to include optional profiles, for example, into the corrugated pipe that is to be produced, exchangeable mold jaw parts are exchanged for a vacuum procedure. In this case, the corrugator in accordance with the invention must have vacuum conduits at least in the area of the molding channel, so that a vacuum can be generated for the vacuum procedure between the exchangeable mold jaw parts and the plastically moldable plastic tube through the openings of the exchangeable mold jaw parts. Since corrugators for vacuum procedures are sufficiently well known, no further explanation is presented here since this knowledge belongs to a person of skill in the art.

Advantageously, recesses can be provided in the exchangeable mold jaw parts for inserting objects into the recesses. The objects have to be connected to the corrugated pipe in the molding apparatus during the molding procedure. This means, for example, that pipe brackets or similar objects can be inserted and connected with the corrugated pipe during the formation of the corrugated pipe.

It can also be advantageous to provide a heating member or a cooling member to the exchange member so that mold jaw parts or exchangeable mold jaw parts can be heated or cooled. By means of modifying the temperature of mold jaw parts or exchangeable mold jaw parts it is possible to attain special effects. For example, a plastic material can be maintained in a plastically moldable state through heated exchangeable mold jaw parts for a long period of time, in order to incorporate complicated shapes into the corrugated pipe or into a section of a corrugated pipe, a sleeve section or the like.

With respect to the magazine technique it is noted that linear working magazine or exchange members can be used but it is also possible to employ other types of magazines. For example, capstan magazines can be used having different chambers for storing exchangeable mold jaw parts or mold jaw parts. However, the respective chambers need to be able to serve as a part of the circulation guides.

The present invention is described below with respect to a preferred embodiment and is explained in further detail with respect to the appended drawings. At the same time further characteristics, advantages, and objectives in accordance with the invention are presented.

BRIEF DESCRIPTION OF THE DRAWINGS

The invention is further described by way of the following drawings in which.

DETAILED DESCRIPTION OF THE PREFERRED EMBODIMENT

Figure 1:
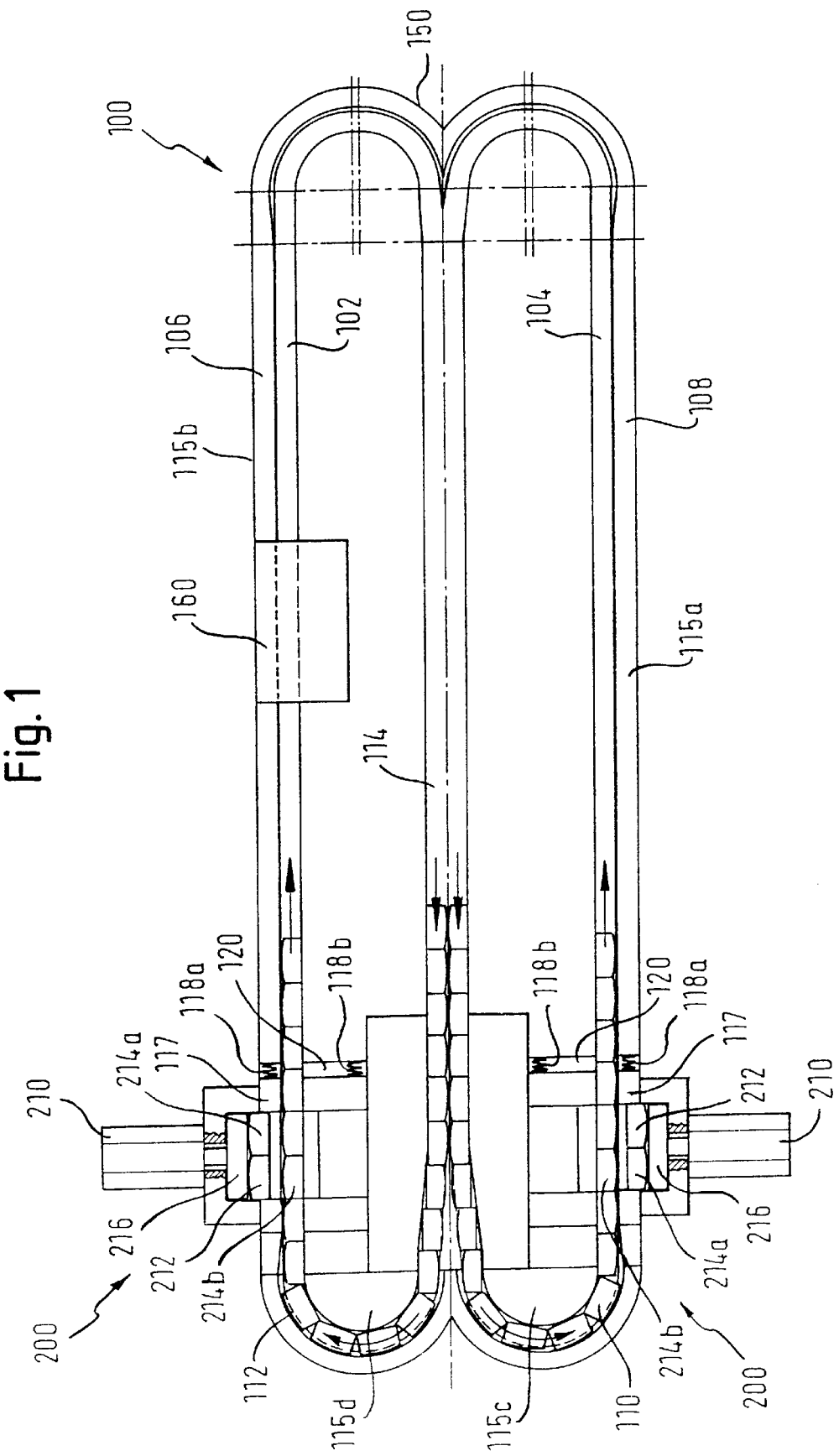
FIG. 1 shows a schematic sectional view through a corrugator having characteristics in accordance with the invention, the sectional view is placed in the plane of the rotating mold jaw part series.
Figure 2:
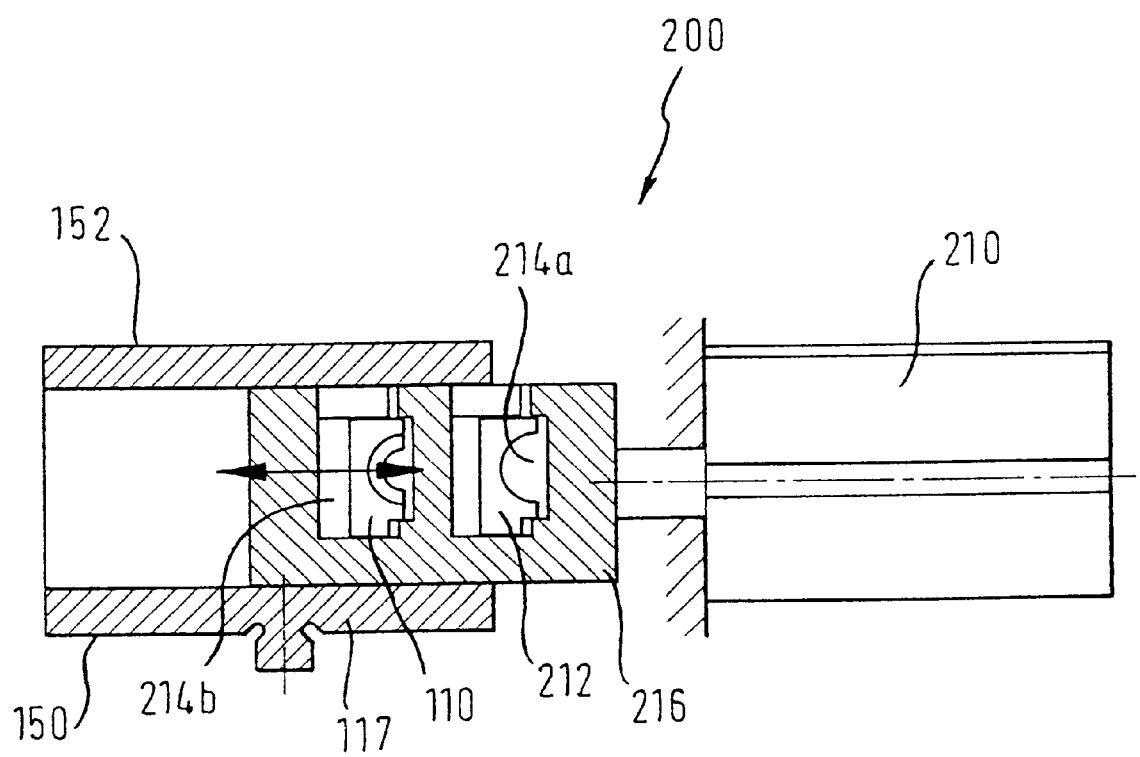
FIG. 2 presents a partial sectional view perpendicular to the plane of FIG. 1 and shows a corrugator in accordance with the invention in the area of the exchange member.

FIGS. 1 and 2 denote identical or functionally equivalent elements with the same numerals.

FIG. 1 shows a molding apparatus in accordance with the invention, particularly a corrugator, which is generally denoted with numeral 100.

The molding apparatus, referred to as corrugator 100 below, has two mold jaw part series 102 and 104, which circulate or rotate endlessly in respective circulation or pass round guides 106 and 108 on a machine table 150. Mold jaw parts 110 and 112 of the two mold jaw part series 102 and 104 form a molding channel 114. The mold jaw part halves are unused in the respective areas 115*a* and 115*b* on the return sides of the molding channel 114, i.e. they are open on one side. At the ends of the mold jaw part series 102 and 104 are turning areas 115*c* and 115*d*, at which a change of direction takes place.

Areas 115*a* and 115*b* are preferred for the arrangement of exchange members 200 and it is possible to arrange one or more exchange members 200 along areas 115*a* and 115*b*.

A sensor 160 is provided in area 115b for a determination of the position of the mold jaw parts. This determination is done immediately or calculated with respect to the exchange members 200 so that an exchange process can be carried out at a suitable time. If only a sensor 160 is provided, a complete synchronization of the operation of the two mold jaw part series is required. In the event, that a complete synchronization can not be guaranteed, it is advantageous to provide at least a sensor 160 for each of the mold jaw part series 102 and 104.

The respective exchange members 200 have respective chambers 214a and 214b, which are designed to be exchangeable components of the circulation guides 106 and 108. The chamber 214a has exchangeable mold jaw parts 212, if necessary with optional profiles for certain sections of pipes or corrugated pipes (not shown), which can be exchanged for mold jaw parts 110 and 112 in the case of an activation of the exchange member 200. Mold jaw parts 110 and 112 pass round or circulate endlessly in respective mold jaw part series 102 and 104.

The exchange members 200 have respective frames 216 for including chambers 214a and 214b. Frame 216 is moved through the pneumatic cylinder 210 such that chamber 214a or chamber 214b are optionally inserted into circulation guides 106 and 108.

A backup occurs since it is not possible to carry out an exchange from chamber 214b to chamber 214a without having a delay in time. This backup is brought under control by means of a longitudinally moving backup channel module 117. During the exchange, the backup channel module 117 springs back against the direction of operation of the mold jaw part series supported by spring members 118a and 118b and hence compensates a backup, which would otherwise occur. A clearance 120 between the backup channel module 117 and the following machine table or following sections of the circulation guides should have dimensions such that a desired compensation can occur. The exchange members 200 travel with the backup modules or are rigidly connected with the respective backup module 117.

The mold jaw parts or exchangeable mold jaw parts contained within one of the chambers 214a, 214b can be provided individually, as pairs, or multiples and hence can be exchanged.

It can be seen from FIG. 2 that chambers 214a, 214b are substantially identical and exchangeable as a part of the circulation or rotation guides. The exchange member having sections 210, 216, 214a, 214b and backup module 117 are relatively moveable with respect to the machine table 150 via clearance 120. A plate 152 covers the corrugator 100 and serves as a boundary for the pass round or rotation guide, as a volume for holding coolant air, etc.

Chamber 214b has a normal mold jaw part 110, which is used for manufacturing corrugations of a normal corrugated pipe. The chamber 214a has an optional mold jaw part 212, which can be temporarily inserted or "shot into" the mold jaw part series, if needed. The term "shot into" expresses the fact that the exchange should occur as fast as possible. In an ideal case, the exchange is performed so quickly that the clearance 120 according to FIG. 1 is not necessary. In reality, however, this is very difficult to achieve.

Figure 3:
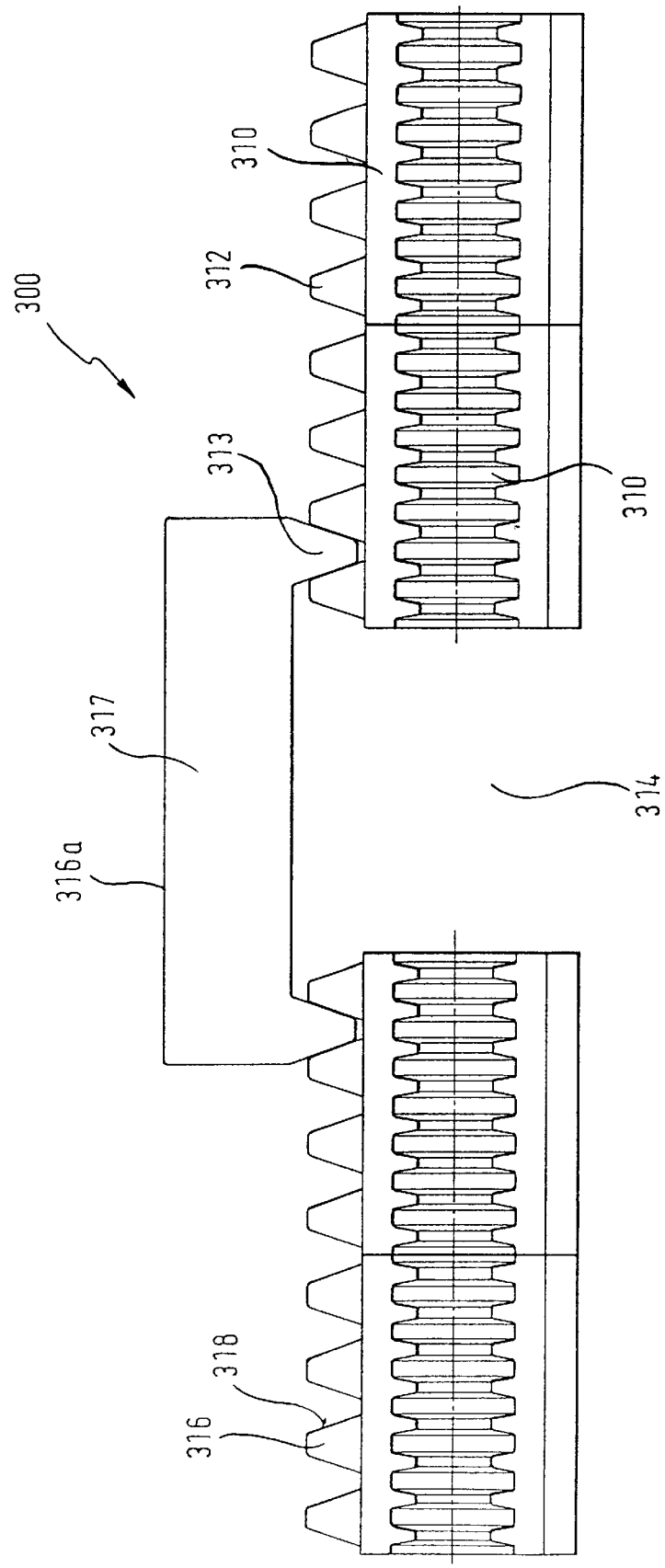
FIG. 3 shows a schematic view of a mold jaw part section with exchange member in accordance with an embodiment of the invention.

FIG. 3 shows a preferred embodiment 300 in which a placeholder 316a engages with a series of mold jaw parts 310. A clearance 314 between successive mold jaw parts 310 is already taken out by means of an exchange member, e.g., exchange member 200 in FIGS. 1 and 2, and need to be replaced with an exchangeable mold jaw part having an optional profile.

The mold jaw parts 310 have sprockets 312, 316. The mold jaw parts are driven by means of a sprocket and further guided into a rotation or circulation guide. The sprockets 316, 312 have a beveled flank or an incline 318, into which the respective extensions or teeth 313 of the placeholder 316a engage. A crossover/overlap area 317 of the placeholder 316a has a length which corresponds at least to the length of a mold jaw part 310. Advantageously, the crossover/overlap area 317 is wider such that the mold jaw parts are pressed apart during the engagement of the placeholder 316a with the mold jaw parts 310 of the mold jaw part series. This makes it easier to exchange a mold jaw part for an exchangeable mold jaw part having an optional profile. At the same time, placeholder 316a with its extensions or teeth 313 is driven into the direction of the sprockets of the mold jaw parts 310, wherein initially the extensions or teeth 313 come into contact with the inclines 318 of the sprockets 316, 312 at an upper end. Afterwards, the incline of the extensions or teeth 313 travels along the inclines 318 of sprockets 312, 316 generating a resulting force in the direction of the traveling mold jaw parts of the mold jaw part series. It is because of this force that the mold jaw parts of the mold jaw part series are driven apart and the place of the mold jaw part to be exchanged is extended and held until the exchangeable mold jaw part having an optional profile is inserted. Afterwards, the placeholder 316a is removed again from its engagement with the mold jaw parts.

Figure 4:
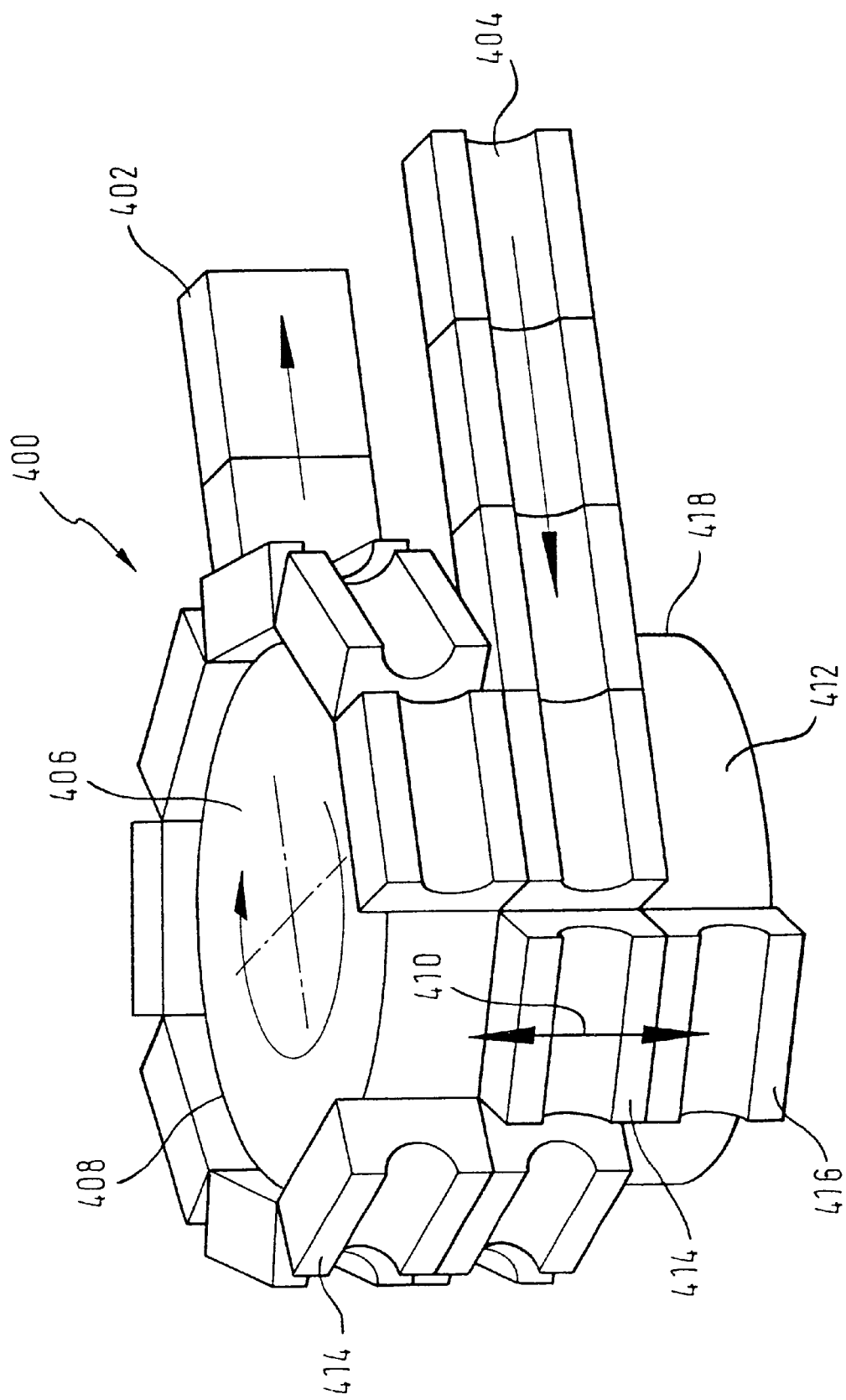
FIG. 4 shows a further embodiment in a schematic, perspective elementary presentation.

In conjunction with FIG. 4, a description is given of another advantageous embodiment 400 of a molding apparatus having characteristics in accordance with the invention. A forward running series 404 of mold jaw parts and a backward running series of mold jaw parts can be seen.

A guidance section for the series of mold jaw parts is provided in a turning area for the series of mold jaw parts. Above the guidance section, there is provided an upper rotating disk 408 of a magazine section 406. The rotating disk 408 of the magazine section 406 contains several exchangeable mold jaw parts 414, which can be moved in the turning area by means of an exchange member (not shown) along the double arrow 410 perpendicular to the direction of movement of the mold jaw part series. Thus, an exchangeable mold jaw part 414 is replaced with a normal mold jaw part 416. The exchanged normal mold jaw part 416 can be stored in the area of a rotating disk 418 of a park-magazine section 412 while the exchangeable mold jaw part 414 travels with the series of mold jaw parts for molding an optional profile into a corrugated pipe or into any other manufactured pipe.

What is claimed is:

1. A molding apparatus for manufacturing corrugated pipes having at least two series of circulation mold jaw parts or mold blocks, each having a same pipe molding and at least one exchangeable mold jaw parts or mold blocks, having a marker section or a sleeve section, wherein the series are guided in respective circulation and/or pass round guides, the circulation mold jaw parts or mold blocks forming a closed circulating series, comprising at least one exchange member along at least one of the circulation and/or pass round guides of at least one of the mold jaw part or mold block series to exchange single circulation jaw parts or mold blocks, or single mold sections of circulation jaw parts or mold blocks, wherein a space is kept free for the single circulation jaw parts or mold blocks, or single mold sections of circulation jaw parts or mold blocks during an exchange process, wherein the exchange member comprises at least two chambers, each of said chambers having an entrance and an exit, and wherein the chambers can be exchanged with at least one exchangeable mold jaw parts or mold blocks of the series guided by the circulation and/or pass round guides.

2. A molding apparatus as defined in claim 1 wherein one of at least two chambers of the exchange member includes at least one exchangeable mold jaw part.

3. A molding apparatus as defined in claim 1 wherein the exchange member includes a drive section for removing a chamber from a circulation and/or pass round guide, said chamber having at least one mold jaw part, and for inserting another chamber into the circulation guide, said another chamber having at least one mold jaw part or one exchangeable mold jaw part.

4. A molding apparatus as defined in claim 1 wherein the number of mold jaw parts or mold blocks, of said two series of circulation for forming a molding channel in a predetermined area, is smaller than the maximum number of mold jaw parts or mold blocks that can be guided by a circular guide and wherein said molding apparatus further includes a conveyer for moving the mold jaw parts outside the mold jaw part channel faster than in the molding channel.

5. A molding apparatus as defined in claim 1 wherein the exchange member is disposed in an area of a circulation and/or pass round guide and wherein a molding channel is open having unclosed mold jaw parts or mold blocks particularly in a linear area on a return side of the molding channel or in a turning area at an end of the molding channel.

6. A molding apparatus as defined in claim 1 wherein a drive section includes a cross slider for one of inserting one of at least two chambers into the circulation guide and removing another one of at least two chambers from the circulation guide.

7. A molding apparatus as defined in claim 6 wherein the cross slider is for performing a linear motion in a plane of the circulation guides or for performing a linear motion perpendicular to the plane of the circulation guides.

8. A molding apparatus as defined in claim 3 wherein the drive section is driven by one of a mechanical member, a hydraulic member, an electromechanical member, an electromagnetic member, and a pneumatic member, said pneumatic member including a pneumatic cylinder.

9. A molding apparatus as defined in claim 1 wherein a damper or a damper area is disposed in a path of the circulation guides for compensating a backup area upon an activation of the exchange member, said damper or damper area being preferably disposed near the exchange member.

10. A molding apparatus as defined in claim 9 wherein the damper is disposed at the exchange member, said damper being preferably rigidly connected with said exchange member.

11. A molding apparatus as defined in claim 9 wherein the damper includes a circulation channel module, said circulation channel module being moveable in a direction of circulation, said circulation channel module being preloaded against the direction of circulation by a spring member.

12. A molding apparatus as defined in claim 9 wherein the damper area or a spring displacement is of a magnitude such that a backup or spring deflection is compensated during a predetermined speed of circulation of the mold jaw parts and during a predetermined and preferably changeable speed of movement of the exchange member.

13. A molding apparatus as defined in claim 1 wherein a sensor is provided to a path of at least one circulation guide for sensing a position of at least one mold jaw part.

14. A molding apparatus as defined in claim 13 wherein the exchange member is activated based on data received from the sensor such that one of at least two chambers is exchangeable for another chamber of the at least two chambers, if boundaries of the at least two chambers or boundaries of the exchange member do not collide with the mold jaw parts or are not aligned with impact positions between the mold jaw parts or mold blocks of the mold jaw part series.

15. A molding apparatus as defined in claim 1 wherein a placeholder is disposed at the exchange member.

16. A molding apparatus as defined in claim 15 wherein the placeholder is a carrier jaw travelling with the mold jaw part series, said carrier jaw having an exchangeable mold or a mold profile section assigned thereto, said exchange member for performing a change of said mold profile section.

17. A molding apparatus as defined in claim 15 wherein the placeholder includes an overlap area for providing an overlap from one mold jaw part to the next mold jaw parts or mold blocks but one, and wherein said placeholder includes engagement sections for engaging with the mold jaw part and the next mold jaw part but one.

18. A molding apparatus as defined in claim 17 wherein said engagement sections are sprockets, and said sprockets are for engaging in recesses or sprockets of the mold jaw parts.

19. A molding apparatus as defined in claim 17 wherein the placeholder enlarges an exchange slot between the mold jaw parts or mold blocks, for a drive section that inserts or removes a chamber in a longitudinal extension.

20. A molding apparatus as defined in claim 18 wherein the engagement sections have an incline such that forces are generated when the sprockets engage with the mold jaw parts for easing an exchange of a mold jaw part located between other mold jaw parts.

21. A molding apparatus as defined in claim 1 wherein a magazine section is disposed at turning areas of the mold jaw parts or mold blocks series, said magazine section travels at least temporarily with one of the mold jaw part series, and wherein the exchange member is preferably disposed at the magazine section.

22. A molding apparatus as defined in claim 21 wherein a plurality of exchangeable mold jaw parts is disposed at the magazine section, said plurality of exchangeable mold jaw parts including a plurality of profiles, and wherein the exchange member is for accessing the exchangeable mold jaw parts.

23. A molding apparatus as defined in claim 21 wherein a park-magazine section is provided across from the magazine section for receiving mold jaw parts replaced by exchangeable mold jaw parts.

24. A molding apparatus as defined in claim 21 wherein the magazine section includes a rotating disk, the exchangeable mold jaw parts or mold blocks being disposed at an outer circumference of the rotating disk, wherein the rotating or revolving disk has substantially a same radius as the turning areas of the rotating mold jaw part series, and wherein preferably a rotating disk disposed within the park-magazine section is also of substantially a same radius.

25. A molding apparatus as defined in claim 1 wherein the exchangeable mold jaw parts are designed for a vacuum procedure, and wherein vacuum conduits are at least disposed in an area of a molding channel of the molding apparatus for generating a vacuum between the exchangeable mold jaw parts or mold blocks and the plastically moldable plastic tube through openings of the exchangeable mold jaw parts.

26. A molding apparatus as defined in claim 1 wherein the exchange member includes one of a heating member and a cooling member for one of respectively heating and cooling the mold jaw parts or the exchangeable mold jaw parts.

27. A molding apparatus as defined in claim 1 wherein the exchangeable mold jaw parts have recesses for storing objects, said objects for connecting with the corrugated pipe during a molding procedure of said corrugated pipe in the molding apparatus.

* * * * *